(12) United States Patent
Savard et al.

(10) Patent No.: US 6,736,216 B2
(45) Date of Patent: May 18, 2004

(54) LASER-GUIDED CONSTRUCTION EQUIPMENT

(75) Inventors: Hassel J Savard, Grand Rapids, MI (US); Robert A Hasara, Provo, UT (US)

(73) Assignee: Leica Geosystems GR, LLC, Grand Rapids, MI (US)

( * ) Notice: Subject to any disclaimer, the term of this patent is extended or adjusted under 35 U.S.C. 154(b) by 5 days.

(21) Appl. No.: 10/275,408

(22) PCT Filed: May 3, 2001

(86) PCT No.: PCT/US01/14194

§ 371 (c)(1),
(2), (4) Date: Nov. 4, 2002

(87) PCT Pub. No.: WO01/86078

PCT Pub. Date: Nov. 15, 2001

(65) Prior Publication Data

US 2003/0226290 A1 Dec. 11, 2003

Related U.S. Application Data

(60) Provisional application No. 60/202,256, filed on May 5, 2000.

(51) Int. Cl.[7] .............................. E02F 9/20; E02F 3/43; E02F 3/84

(52) U.S. Cl. .............................. 172/1; 172/4.5; 37/195; 37/348; 37/382; 414/699; 701/50; 404/84.5; 405/175

(58) Field of Search .................... 172/1, 2, 4.5; 37/382, 37/381, 411, 412, 414, 415, 348, 195; 414/699; 701/50; 404/84.5, 83; 405/15 A, 17 A, 175; 356/139.03, 141.2, 141.3, 141.4, 141.5, 152.1–152.3, 139.1, 147; 348/141

(56) References Cited

U.S. PATENT DOCUMENTS

| 4,231,700 A | 11/1980 | Studebaker ................. 414/700 |
| 4,769,700 A | 9/1988 | Pryor ......................... 358/107 |
| 4,805,086 A | 2/1989 | Nielsen et al. ......... 364/167.01 |
| 4,829,418 A | 5/1989 | Nielsen et al. ......... 364/167.01 |
| 4,866,641 A | 9/1989 | Nielsen et al. .............. 364/559 |

(List continued on next page.)

FOREIGN PATENT DOCUMENTS

| DE | 19730233 A1 | 1/1999 |
| DE | 19737858 A1 | 1/1999 |
| EP | 0620318 A1 | 10/1994 |
| EP | 0736748 A2 | 10/1996 |
| FR | 2609068 | 7/1988 |
| JP | 8160127 | 6/1996 |
| JP | 291048 A | 10/2000 |

*Primary Examiner*—Christopher J. Novosad
(74) *Attorney, Agent, or Firm*—Van Dyke, Gardner, Linn & Burkhart, LLP

(57) ABSTRACT

A construction apparatus (12) and method of controlling a construction apparatus from a laser source (38) made up of a substantially non-rotating beam (56). The construction apparatus includes a body (14), a construction tool (16) adapted to move material, a support moveably supporting the construction tool from the body and a control for guiding movement of the construction tool. A control is provided including a camera (28) that is adapted to capture an illuminated image that is derived from the laser source. The control determines direction information of the illuminated image with respect to the apparatus at least in part from an output of the camera. The control is further adapted to determine separation information of the spot with respect to the body and a physical relationship between the construction tool and the illuminated image. The construction tool (16) can be guided with respect to the illuminated image as a function of the direction and separation information and the physical relationship between the construction tool and the illuminated image.

57 Claims, 8 Drawing Sheets

U.S. PATENT DOCUMENTS

| | | |
|---|---|---|
| 4,888,890 A | 12/1989 | Studebaker et al. ........... 37/103 |
| 4,945,221 A | 7/1990 | Nielsen et al. ............ 250/203.1 |
| 5,296,915 A | 3/1994 | Akesaka ...................... 356/400 |
| 5,430,651 A | 7/1995 | Nielsen et al. .......... 364/424.07 |
| 5,528,498 A | 6/1996 | Scholl ................... 364/424.07 |
| 5,559,725 A | 9/1996 | Nielson et al. .............. 364/550 |
| 5,621,531 A | 4/1997 | Van Andel et al. ......... 356/399 |
| 5,625,967 A | 5/1997 | Kulle ........................... 37/443 |
| 5,713,144 A | 2/1998 | Haraoka ....................... 37/348 |
| 5,738,187 A | 4/1998 | Dammeyer et al. ......... 187/222 |
| 5,812,721 A * | 9/1998 | Ingvarsson et al. ......... 385/115 |
| 6,052,181 A | 4/2000 | Maynard et al. ............ 356/147 |
| 6,067,152 A | 5/2000 | Rando ..................... 356/152.1 |

* cited by examiner

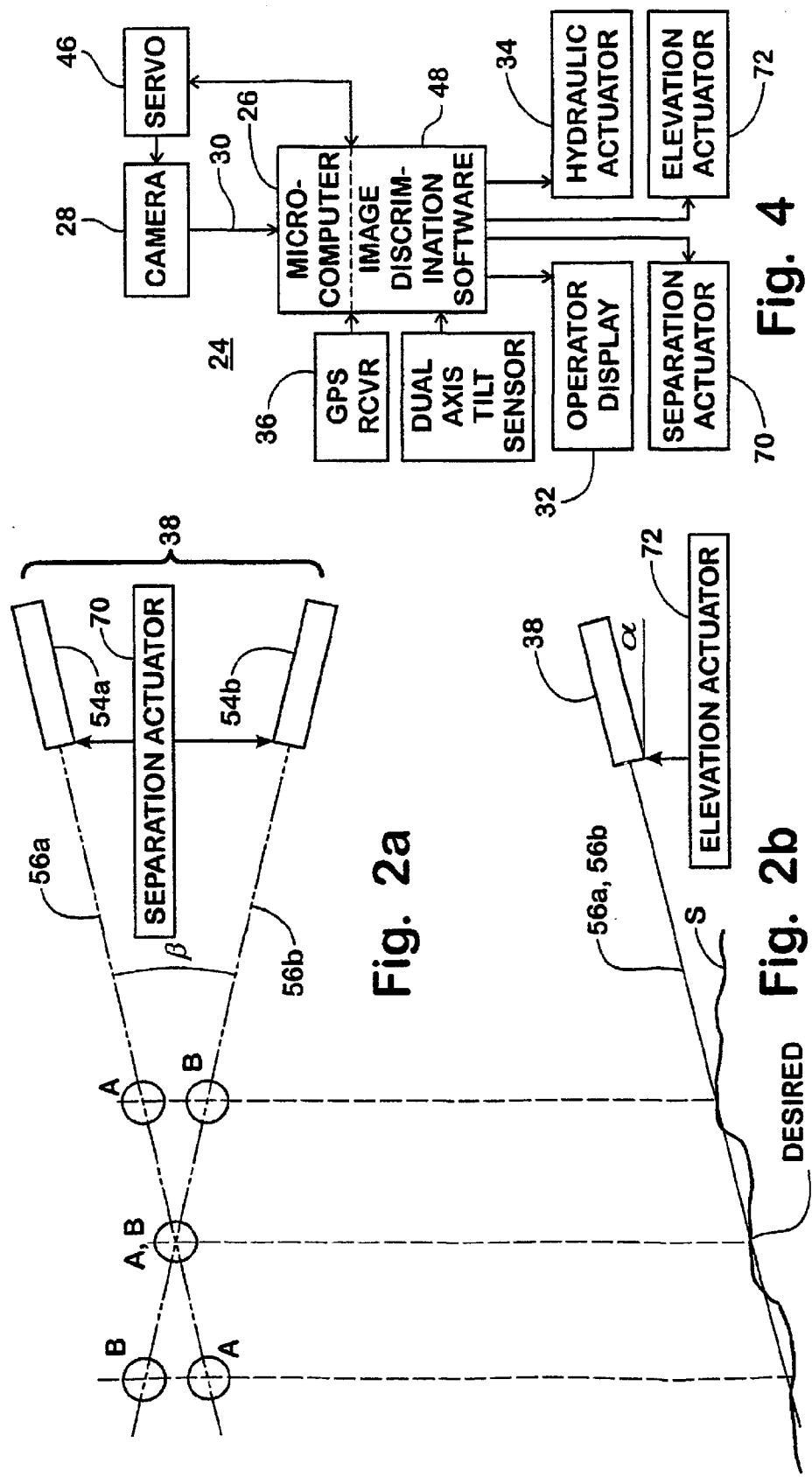

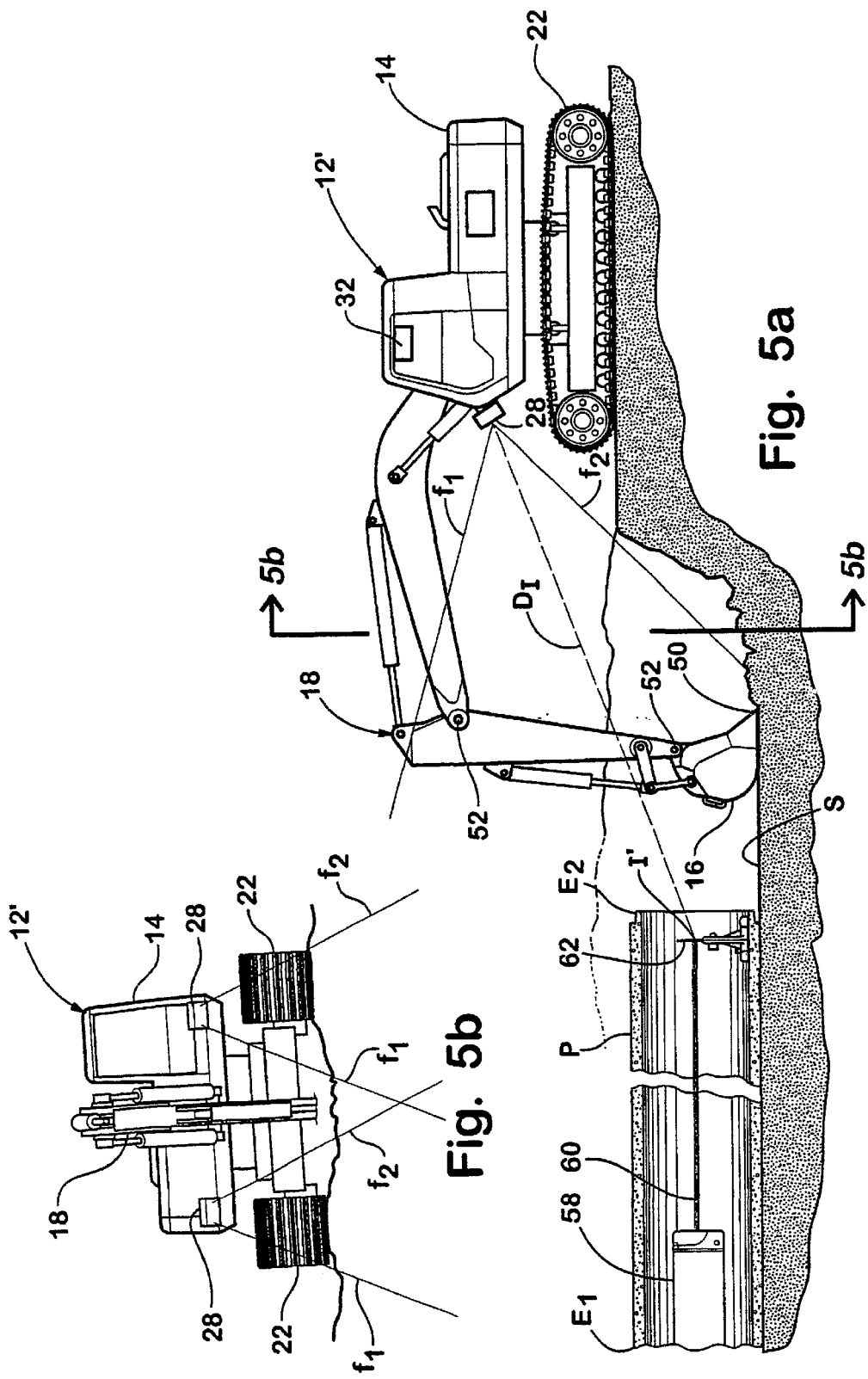

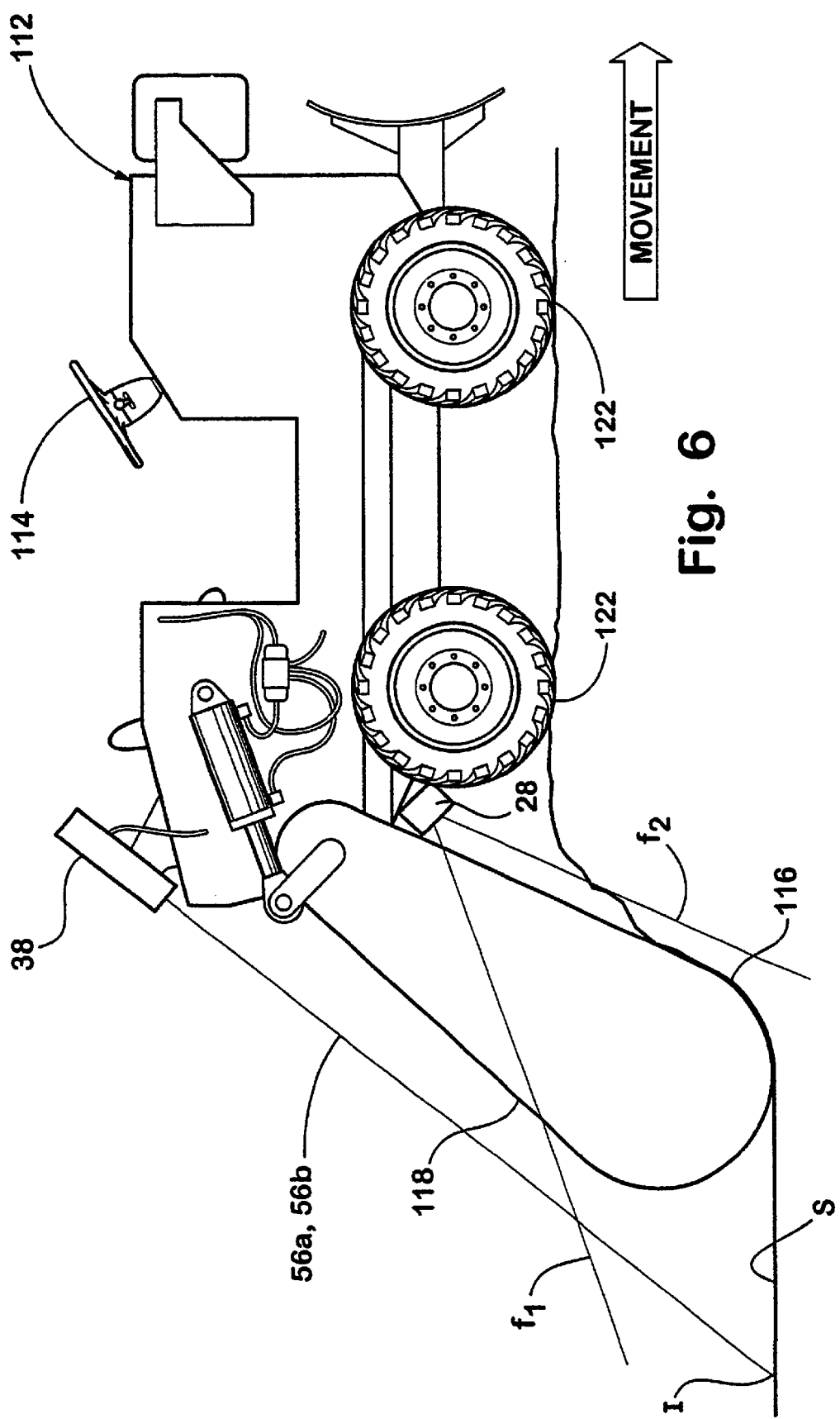

LASER-GUIDED CONSTRUCTION EQUIPMENT

CROSS-REFERENCE TO RELATED APPLICATION

This application claims priority from U.S. provisional patent application Ser. No. 60/202,256, filed on May 5, 2000, the disclosure of which is hereby incorporated herein by reference in its entirety.

BACKGROUND OF THE INVENTION

It has been known to utilize a laser generator in association with a construction implement in order to assist in the control of the implement. Such known systems utilize a separate laser generator which generates a laser plane in order to provide a reference, set horizontally or at a grade, in order to assist, either manually or automatically, excavating to a given depth. Such laser planes may be generated either by sweeping a beam in a plane or by utilizing an optic to convert a beam to a plane. While useful, such known systems require extensive setup and are limited in application. Such known systems also use inclination sensors, rotary angle monitors, and the like, to monitor position and orientation of the various members making up the articulated support. Such devices are exposed to the elements at their positions of usage on the articulated support and typically require that wiring be strung along the moveable articulated support.

SUMMARY OF THE INVENTION

The present invention provides a construction apparatus which utilizes laser guidance in a new and unique fashion to enhance the functionality of a construction implement. This is accomplished by utilizing an imaging sensor, or camera, to capture an image derived from a laser source. The laser source is a beam that is substantially non-rotating. This allows the present invention to perform functions beyond those of the prior excavator controls, as well as to provide a self-contained apparatus that does not require set-up and take-down of a separate laser generator. Also, the present invention provides the capability for establishing, not only the depth, but also the geographic position of the construction tool, thereby further enhancing the functionality of the construction apparatus.

A construction apparatus and method of controlling the construction apparatus from a laser source made up of a substantially non-rotating beam, according to an aspect of the invention, includes providing a body having a cab that is adapted to be moveably supported by a surface. A construction tool is provided that is adapted to move material. A support moveably supports the construction tool from the body. A control is provided for guiding movement for the construction tool. The control includes a camera that captures an illuminated image derived from a laser source. The control determines direction information of the illuminated image at least in part from an output of the camera. The control further determines location information of the construction tool. In this manner, the construction tool can be guided with respect to the illuminated image derived from the laser source as a function of the direction information and location information.

These and other objects, advantages and features of this invention will become apparent upon review of the following specification in conjunction with the drawings.

BRIEF DESCRIPTION OF THE DRAWINGS

FIG. 2a is a top plan view of a laser source useful with the construction apparatus in FIG. 1;

FIG. 2b is a side elevation of the laser source in FIG. 2a;

FIG. 4 is a block diagram of an electronic control system, according to the invention;

FIG. 5a is the same view as FIG. 1 of an alternative embodiment of the invention;

FIG. 5b is a front elevation of the construction apparatus in FIG. 5a as viewed from direction 5b—5b.

FIG. 6 is the same view as FIG. 1 of another alternative embodiment of the invention;

DESCRIPTION OF THE PREFERRED EMBODIMENT

Figure 1:
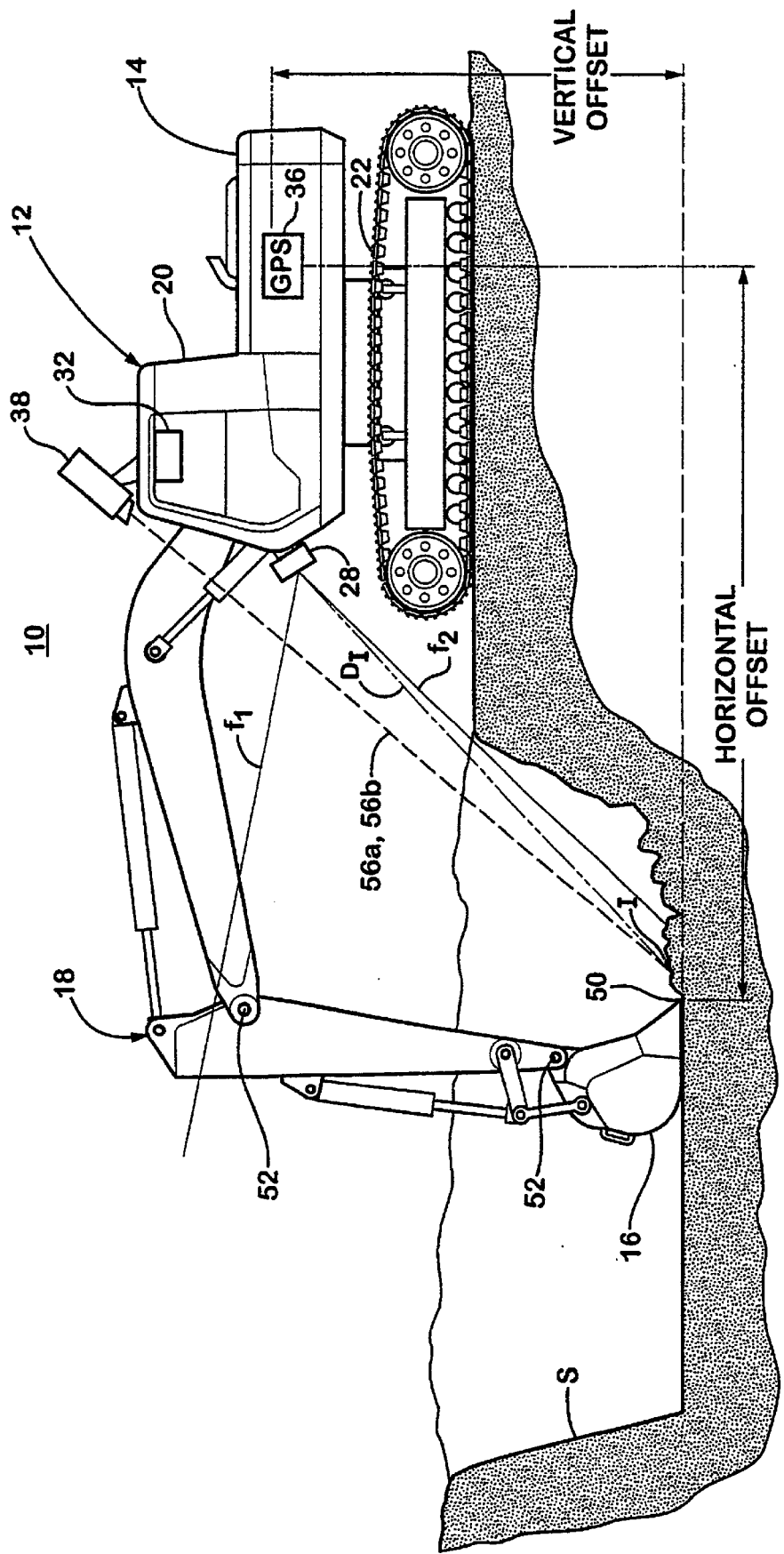
FIG. 1 is a side elevation of a construction apparatus, according to the invention.

Referring now specifically to the drawings, and the illustrative embodiments depicted therein, a construction apparatus 10, which is illustrated as an excavator 12, includes a body 14, a construction tool in the form of a bucket 16 and a support 18 for moveable supporting buckets 16 from body 14 (FIG. 1). Body 14 includes an operator cab 20 and is moveably supported on a surface by propelling devices 22, such as wheels, treads, caterpillars, or the like.

Construction apparatus 10 further includes a microcontroller-based control 24 including a microcomputer 26 and an imaging sensor, or camera, 28 having an output 30 in order to supply captured image data to microcomputer 26 (FIG. 4). Control 24 additionally includes an operator display 32, positioned in cab 20 in order to display to the operator information pertaining to the location of bucket 26, as will be set forth in more detail below. With such information displayed to the operator with display 32, the operator can manually actuate convention controls (not shown) in order to manipulate bucket 16 while viewing display 32. Optionally, control 24 may include an actuator system 34 to operate hydraulic valves (not shown) in order to control the movement of support 18 such that operation of bucket 16 is under full automatic control of the control 24 unless overridden by the operator. Control 24 may additionally include a Geographic Positioning System, or Global Positioning System, (GPS) 36 which receives signals from geostationary satellites (not shown) in order to provide an indication of the geographic position of body 14 in three dimensions including elevation, latitude and longitude. Such geographic positioning systems are commercially available and well-known in the art.

Construction apparatus 10 further includes a laser source 38 in the form of a non-rotating laser beam which is directed toward surface S thereby producing an illuminated image that is derived from laser source 38, as will be explained in more detail below. Camera 28 has a field of view extending generally from $f_1$ to $f_2$, both vertically and laterally, thereby capturing images within the field of view $f_1$, $f_2$. Advantageously, camera 28 is positioned on body 14 under articulated support 18. This provides a good view of the work site as well as provides protection for camera 28 from debris, and the like, that may otherwise fall on the sensor. The camera may further be protected by shutters, cleaners, heaters, and the like, as are known in the art. The illuminated image I derived from laser source 38 is captured by imaging sensor 28 along direction $D_I$.

Figure 3B:
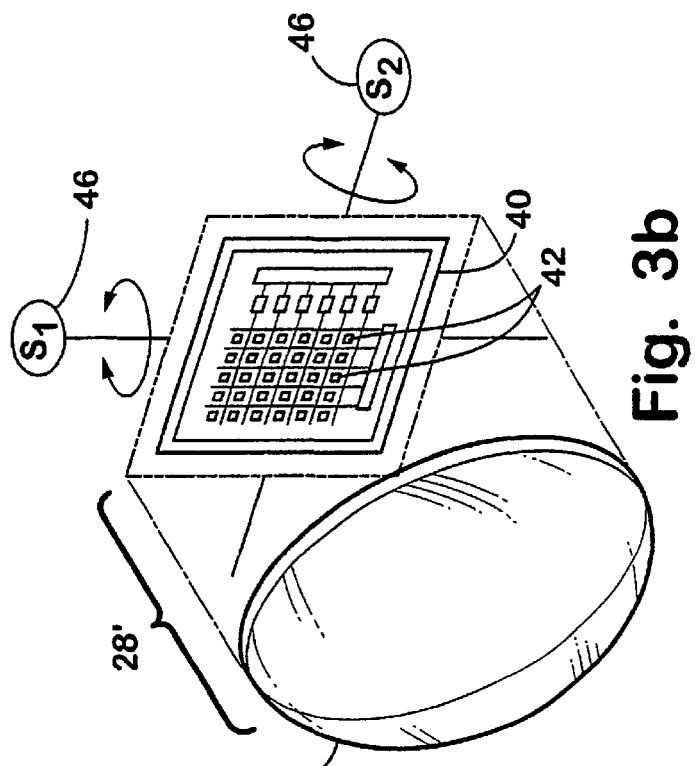
FIG. 3b is the same view as FIG. 3a of an alternative embodiment thereof.
Figure 3C:
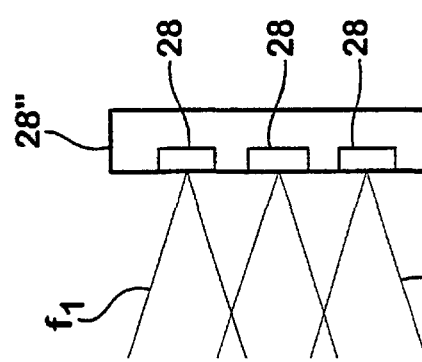
FIG. 3c is a top plan view of an imaging sensor array, according to the invention.
Figure 3A:
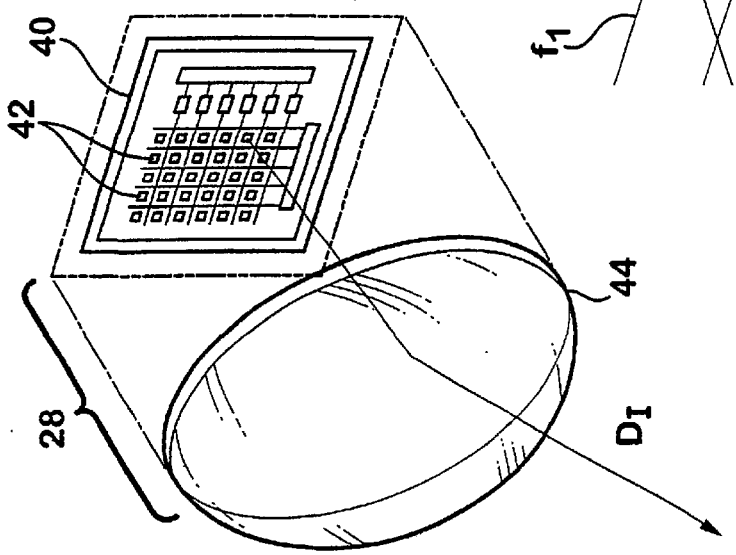
FIG. 3a is a perspective view of an imaging sensor, or camera, that is useful with the invention.

Camera 28 includes a pixilated image plane 40 including an array of pixels 42 for sensing light levels of an image captured by imaging sensor 28 (FIGS. 3a–3c). Imaging sensor 28 further includes a focusing optic 44 in order to focus images onto image plane 40. Preferably, focusing optic 44 is a wide-angle lens in order to provide a wide field of view $f_1$, $f_2$. Imaging sensor 28 may determine the direction $D_I$ by determining which pixel or pixels 42 intercept image I as illustrated in FIG. 3a. As will be understood by a skilled artisan, the pixel or pixels 42 that are intercepted by image I are related to the direction $D_I$ with respect to imaging sensor 28.

Alternatively, imaging sensor 28 may be mounted on one or more servo-driven gimbals 46 which are capable of repositioning image plane 40 under the feedback control of microcomputer 26 in order to track image I by adjusting servos $S_1$, $S_2$ until image I is centered among pixels 42 (FIG. 3b). Computer 26 is able to determine direction $D_I$ from the positioning information from servos 46 as would be understood by the skilled artisan. Imaging sensor 28, 28' may be a single sensor or may be arranged in a sensor array 28", illustrated in FIG. 3c, including multiple imaging sensors arranged side-by-side in order to increase the field of view $F_1$, $F_2$. Cameras 28, 28', 28" are either CCD imaging sensors or MOS sensors, both of which are of low cost and commercially available in combination with focusing optic 44 from various sources.

Microcomputer 26 may be programmed with image discrimination software, such as shape recognition software 48. Such software is known in the field of inspection systems for determining whether manufactured components meet design requirements. Shape recognition software 48 allows microcomputer 26 to capture images of one or more features of bucket 16 and support 10. This may include teeth 50 of bucket 16. As would be apparent to the skilled artisan, microcomputer 26 is capable of using shape recognition software 48 to determine at least general location information of teeth 50 from images captured by imaging sensor 28, particularly the relationship between teeth 50 and illuminated image I. With location information of the bucket teeth 50 known with respect to illuminated image I, either the operator viewing display 32 or the control operating actuator 34 can position teeth 50 in relationship to the illuminated image I derived from laser source 38.

In the illustrative embodiment, laser source 38 generates an image I having a pattern that varies as a function of separation between laser source 38 and illuminated image I. Referring to FIG. 2a, this may be accomplished by providing two or more lasers 54a, 54b generating beams 56a, 56b that are distinguishable from each other. This may be accomplished by utilizing polarization, modulation, phasing, color or other means to allow beams 56a, 56b to be distinguishable from each other by camera 28. Lasers 54a, 54b may generate beams in the red, infrared, green, blue, or other portions of the spectrum. Camera 28 is adapted to distinguish beams 56a, 56b such as by having corresponding polarity sensors, color sensors, demodulation means, or the like. As can be seen by reference to FIG. 2a, beams 56a, 56b intersect. To the left of the intersection, as viewed in FIG. 2a, beam 56b is above beam 56a. As viewed in FIG. 2a, to the right of the point of intersection, beam 56a is above beam 56b. At the point of intersection of the beams 56a and 56b, a single illuminated image I will be generated and captured by imaging sensor 28.

If beams 56a, 56b contact ground S closer to body 14 than where they intersect, the image produced by beam 56a will be above the spot produced by beam 56b, as viewed in FIG. 2a, or to the right of the spot produced by beam 56b as viewed from body 14. In a similar fashion, if beams 56a, 56b contact surface S further away from body 14 than their point of intersection, the spot produced by beam 56b will be to the right of the beam produced by 56a as viewed from body 14. This relationship, as well as the separation between spots produced by the beams, distinguish the distance of the spots from body 14 allowing control 24 to determine the depth of image I with respect to body 14 by knowing the angle of separation β between the beams and the angle of inclination of the beams. Moreover, actuators 70 and 72 may be provided to adjust, respectively, the separation angle β and the elevation angle α under control of microcomputer 26 so that control 24 can set a desired depth. By making adjustments to the angle β between laser generators 54a, 54b, and the angle of inclination, the image I can be set to produce a single spot at a desired depth of dig of teeth 50. This can be accomplished by microcomputer 26 using suitable algorithms. Moreover, because the spot pattern is different, i.e., the distinguishable spots from beams 56a, 56b reverse, if the surface contacted by the beams is above or below the desired depth, suitable control can be effected to seek desired depth. A dual-axis inclination sensor on body 14 of excavator 12 provides a signal to microcomputer 26 to allow any inclination of body 14 to be factored into the determination of spot depth. In this manner, excavator 12 can excavate to a desired depth either manually or automatically. It should be understood that the side-by-side arrangement of beams 56a, 56b is for illustration purposes only. The beams could, alternatively, be arranged in a vertical plane or any other desired orientation.

Control 24 may further have the ability to determine position coordinates for teeth 50 with respect to body 14 thereby allowing control 24 to determine a geographic position of bucket teeth 50 by combining offset of the teeth from the body with geographic information determined by GPS receiver 36. GPS receiver 36 may be a direct receiver or a differential receiver of the type known in the art. This allows excavator 12 to excavate according to a site plan including complex contours, such as along an embankment, and the like. Determining position coordinates of teeth 50 with respect to body 14 may be accomplished by using conventional techniques to measure orientation of the members making up moveable support 18. These may include, by way of example, positioning angle encoders at each pivot 52, inclination encoders at the members making up support 18, or, otherwise, measuring angles or inclination of the members making up articulated support 18 such as disclosed in commonly assigned U.S. Pat. Nos. 4,805,086; 4,829,418; 4,884,939; 4,866,641; 4,945,221; 5,742,069; 5,572,809; and 5,953,838, the disclosures of which are hereby collectively incorporated herein by reference. Other techniques may be utilized by control 24 to determine a coordinate of teeth 50. Software 48 may be able to determine a distance of teeth 50 by comparing a size of the image of teeth 50 captured against a database, or the like, in order to match the size of the image of the teeth with a distance of teeth from body 14. With such scheme, it may be desirable to provide a rotary encoder for monitoring vertical axis rotation of body 14 about propelling devices 22.

In another embodiment, an excavator 12' includes an imaging sensor 28 which receives an illuminated image I' produced by a pipe laser 58 and determines a direction $D_I$ to image I' and a distance of the image from body 14. In particular, pipe laser 58 produces a laser beam 60 which impinges a target 62 as disclosed in commonly assigned U.S. Pat. No. 5,621,531, the disclosure of which is hereby incorporated herein by reference. Distance of image I' from body 14 may be determined using two laterally spaced cameras 28 (FIG. 5b). Using known relationships, distance between image I' and body 14 may be derived from the directions of the images captured by both cameras. Distance of image I' above the bottom of the trench is a known parameter. As in the previous embodiment, imaging sensor 28 captures images of image I' and bucket 16 including teeth 50 to determine information or the location of illuminated image I' and the relative orientation of teeth 50 to image I'. In this manner, control 24 is able to guide teeth 50 with respect to image I'. This allows the excavator operator or control 24 to guide teeth 50 in a manner to extend the trenches in which pipe P is being laid. It may be necessary to restrict movement of support 18, so that the bucket is lifted out of the trench before it interferes with the view of image I' by cameras 28. Alternatively, the control may be configured to accommodate momentary disruption of the view. Target 62 may include diffractive elements as disclosed in commonly assigned application Ser. No. 09/527,372 filed Mar. 16, 2000, the disclosure of which is hereby incorporated herein by reference. This facilitates a pipe laser using a beam that operates in the green portion of the spectrum, but could also utilize a beam in the blue, red, or infrared portion of the spectrum.

Alternatively, excavator 12' may have a laser unit 38 (not shown in FIG. 5) that generate a non-rotating beam that can be pointed at ends $E_1$, $E_2$ of pipe P. With some knowledge of the position of ends $E_1$, $E_2$ as well as the grade of pipe P, the invention comprehends the use of such information to continue the trench in which pipe P is positioned at a desired depth for proper depth and grade of the pipe. One difficulty that may occur is that the starting end $E_1$ is often backfilled long before the entire pipeline is complete. This may be overcome by providing a mark above ground of the location of $E_1$ such as by the location of a manhole, stake, or the like.

Figure 9:
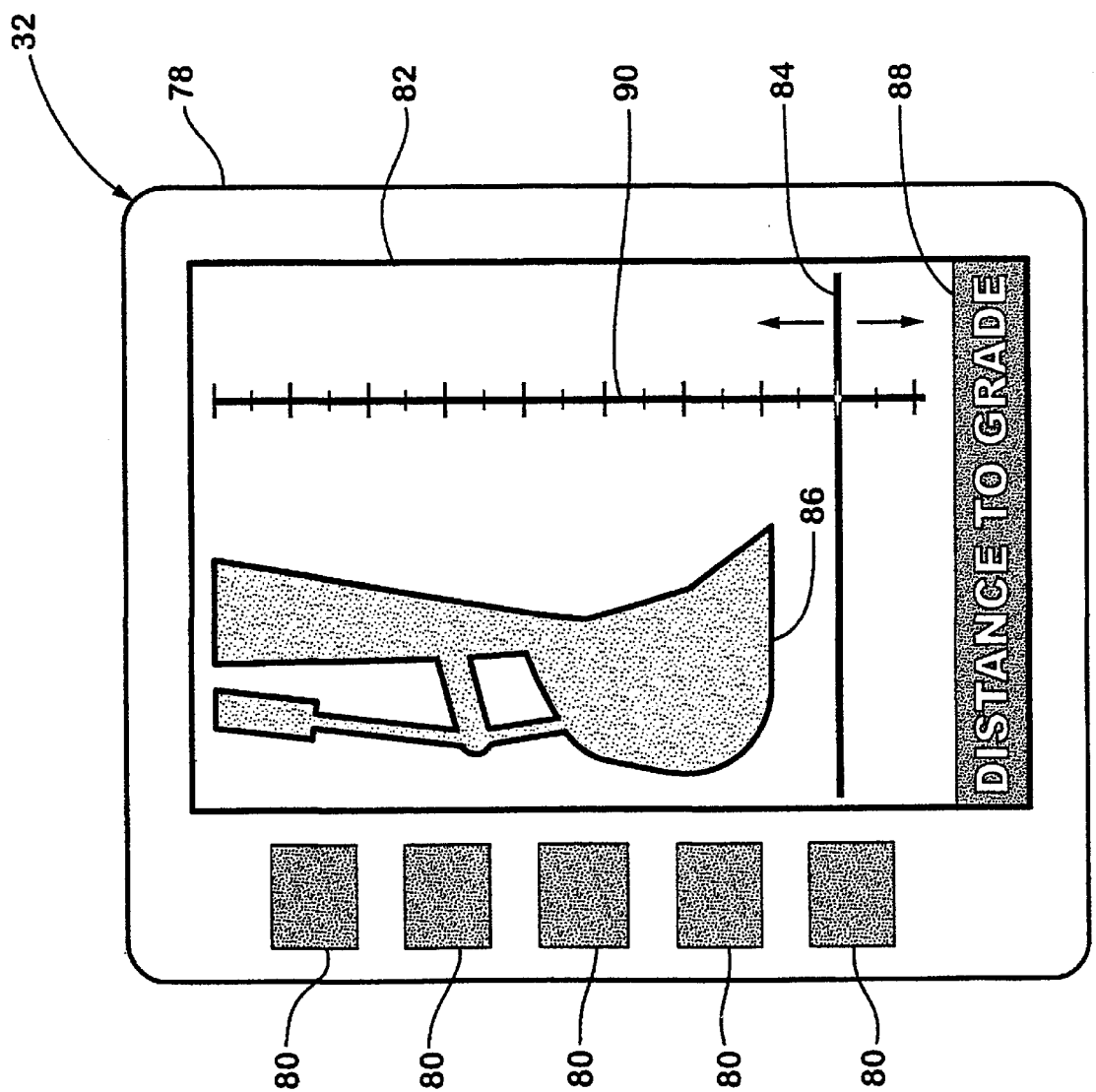
FIG. 9 is an elevation of an operator display panel as viewed by an operator.

An operator display panel 32 that is useful with the invention is illustrated in FIG. 9. Operator display panel 32 may include a touch sensitive display panel 78 having one or more hard or soft switches 80 that are useful by the operator in controlling the functions of operator display 32. The panel additionally includes a display portion 82 having an icon 86 illustrating a position of bucket 16 with respect to a grade line 84 which, as previously set forth, is determined from the illuminated image I captured by camera 28. When the difference in elevation between bucket 16 and grade line 84 is relatively great, grade line 84 would be off the screen at the bottom. As the difference narrows, the desired grade line 84 would rise as illustrated. When bucket teeth 50 reach grade line 84, the icon 86 would illustrate the same. Additionally, a distance to grade readout 88 may be provided to illustrate the distance between the bucket teeth and the grade line. A reach line 90 may also be provided in order to illustrate to the operator the relative position of bucket 16 in a vertical plane.

The present invention may also be directed to a construction apparatus in the form of a trencher 112 having a trencher body 114 moveably supported by wheels 122 and a construction tool in the form of a trenching implement 116 which is moveably supported by support 118 (FIG. 6). A control system for trencher 112 includes an imaging sensor in the form of a camera 28 and a laser source 38 which produces a non-rotating laser beam which is directed generally in the area of the trenches being formed by trencher 112. Laser source 38 creates an illuminated beam I in the trench. Camera 28 captures the illuminated image I as well as a portion of trenching implement 116 in order to allow the trenching implement to be controlled either manually by an operator or automatically utilizing principles previously described as would be understood by the skilled artisan. Trencher body 114 and implement 116 are as generally described in commonly assigned U.S. Pat. No. 5,559,725, the disclosure of which is hereby incorporated herein by reference.

Figure 7:
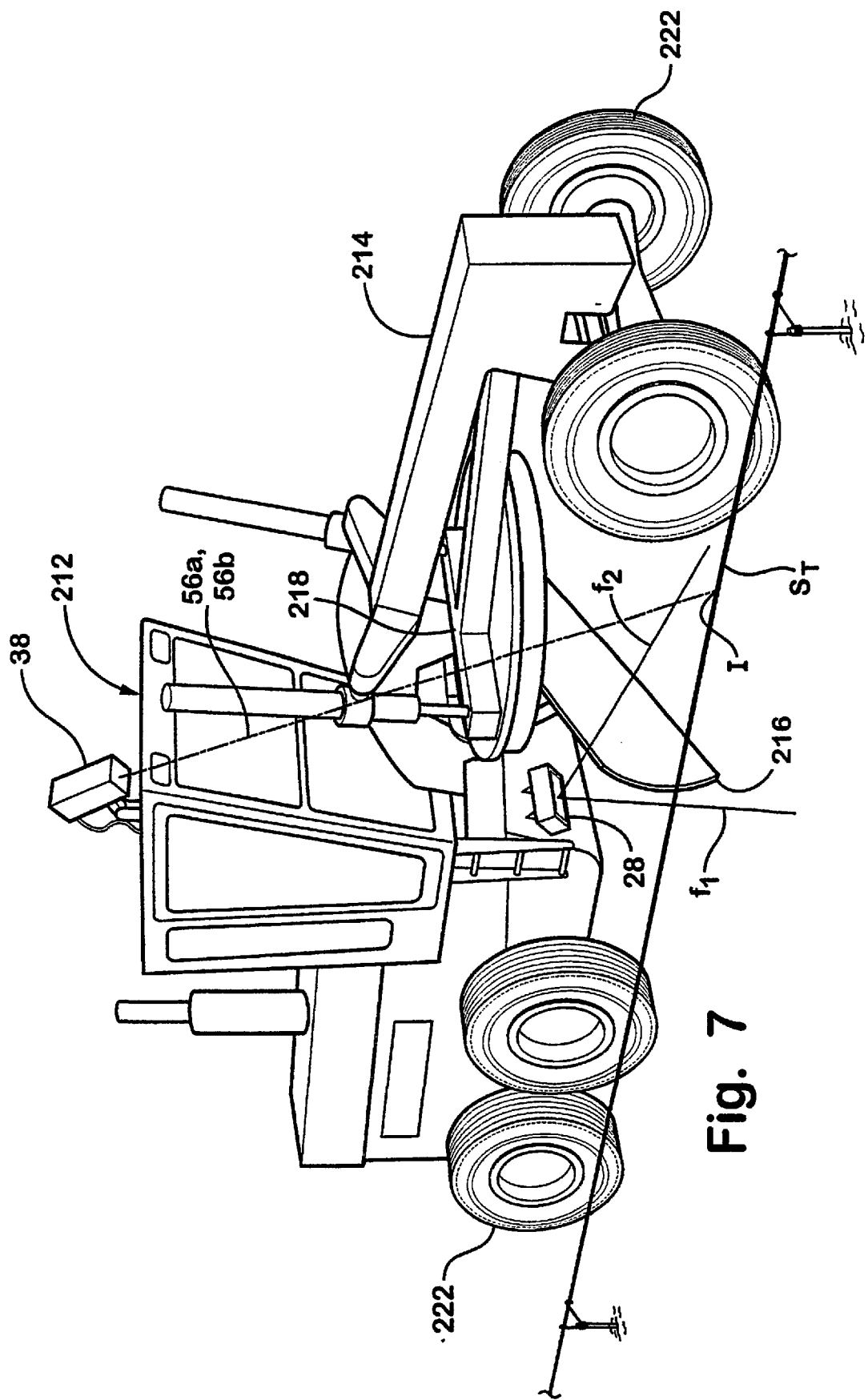
FIG. 7 is the same view as FIG. 1 of another alternative embodiment of the invention.

The principles of the invention may also be applied to a grader 212 having a grader body 214 that is propelled by propelling wheels 222 and a construction tool in the form of a blade 216 which is connected with body 214 by a support 218 (FIG. 7). A laser source 38 generates a non-rotating laser beam to create an image I at a string S, a road bed, a curb, or the like. An imaging sensor in the form of a camera 28 which captures image I illuminated by laser source 38 and a portion of blade 216 in order to control blade 216 utilizing the principles previously disclosed herein. Grader 212 is, otherwise, as disclosed in commonly assigned U.S. Pat. Nos. 5,327,345 and 6,152,238, the disclosures of which are hereby incorporated herein by reference.

Figure 8:
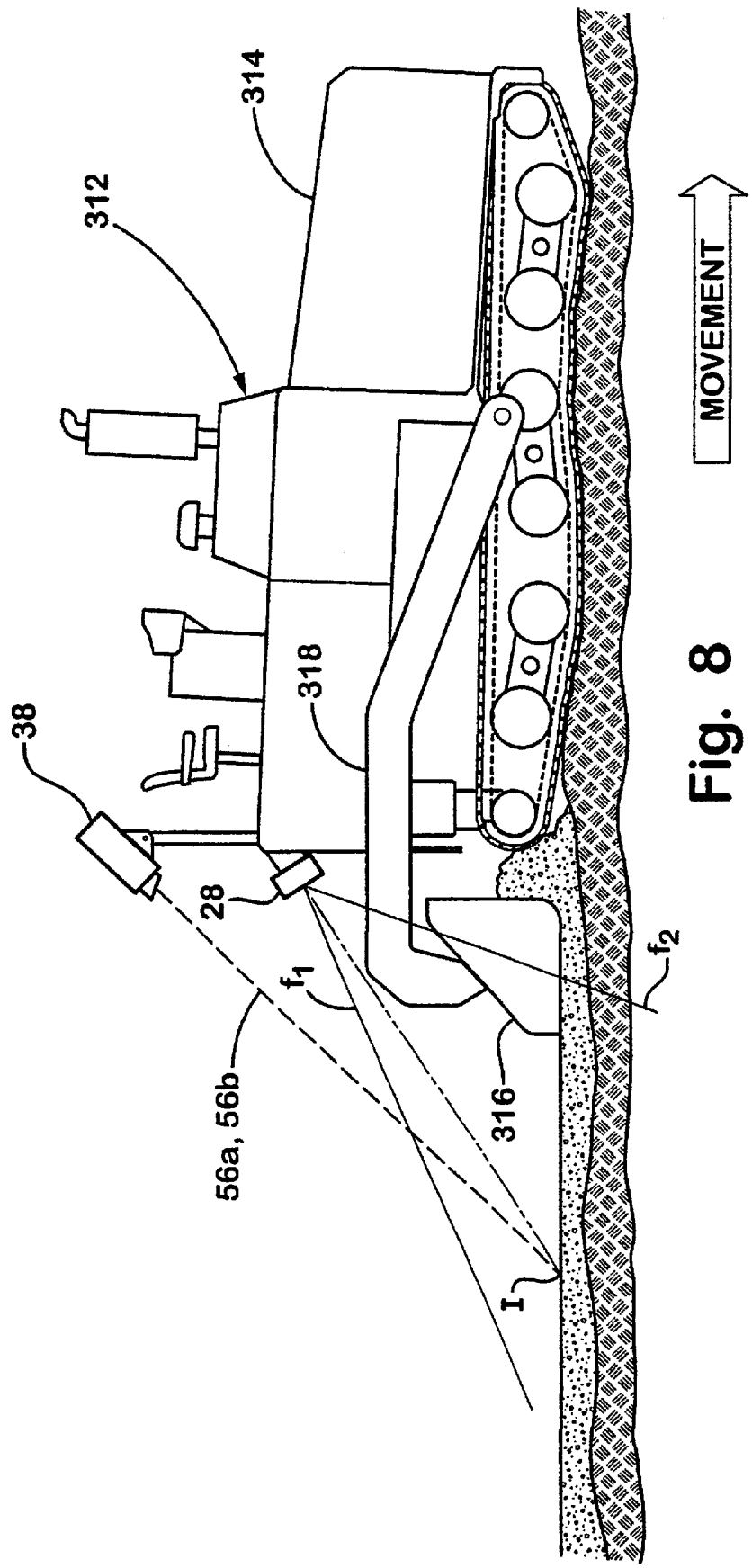
FIG. 8 is the same view as FIG. 1 of yet another alternative embodiment of the invention.

The principles of the invention may also be applied to a construction apparatus in the form of a paver 312 having a body 314, a screed 316, a laser scanner 38, which generates a non-rotating laser beam that is directed at the previously laid surface thereby generating an illuminated image I. Illuminated image I is captured by a camera 28 along with a portion of screed 316 to allow elevation of screed 316 to be controlled to a desired pavement elevation (FIG. 8). Paver 312 may be a concrete paver wherein screed 338 would be a concrete screed of the type that is known in the art. Alternatively, paver 312 may be an asphalt paver for which screed 338 would be an asphalt screed of the type that is well known in the art.

Thus, it is seen that the present invention utilizes laser technology in a manner previously unknown in the art of construction machine control. Such known systems utilize a laser to control the depth of material to be worked as an offset from a stationary laser generator, the present invention provides enhanced flexibility and control of the various material working operations. Furthermore, this is accomplished with laser generators that are either mounted to the body of the construction apparatus or are being utilized for other purposes. Furthermore, the present invention comprehends the use of image discrimination software in order to allow the control to monitor movement of the construction tool to thereby guide the construction tool with respect to the illuminated image formed by the laser generator. By utilizing a Geographic Positioning System (GPS) mounted to the construction apparatus body, actual geographic X, Y coordinates of the construction tool may be determined, utilizing an offset between the coordinates of the construction tool and the construction apparatus body. This allows the invention to be utilized in earth-forming applications where complicated contours are laid out for the job site.

Changes and modifications in the specifically described embodiments can be carried out without departing from the principles of the invention. For example, the controls may be fully digital or at least partially analog in nature. The invention is intended to be limited only by the scope of the appended claims, as interpreted according to the principles of patent law including the doctrine of equivalents.

The embodiments of the invention in which an exclusive property or privilege is claimed are defined as follows:

1. A construction apparatus that is adapted to be guided from a laser source made up of a substantially non-rotating beam, said construction apparatus comprising:
   a body having an operators cab, said body adapted to be moveably supported by a surface, a construction tool adapted to move material, a support moveably supporting said construction tool from said body, and a control for guiding movement of said construction tool;
   said control comprising a camera that is adapted to capture an illuminated image that is derived from a laser source, said control adapted to determine direction and separation information of the illuminated image with respect to said apparatus, wherein said control determines said direction information at least in part from an output of said camera;
   said control further adapted to determine a physical relationship of said construction tool with respect to said illuminated image;
   whereby said construction tool can be guided with respect to the illuminated image as a function of said direction and separation information and said relationship.

2. The construction apparatus of claim 1 including a display at said cab for displaying information related to said direction and separation information and said relationship.

3. The construction apparatus of claim 1 wherein said control is adapted to automatically guide said construction tool with respect to said illuminated image by comparing said direction and separation information and said relationship.

4. The construction apparatus of claim 1 wherein said body comprises an excavator body and said construction tool comprises an excavation bucket.

5. The construction apparatus of claim 1 wherein said body comprises a grader body and said construction tool comprises a blade.

6. The construction apparatus of claim 1 wherein said body comprises a trencher body and said construction tool comprises trenching implement.

7. The construction apparatus of claim 1 wherein said body comprises a paver body and said construction tool comprises a screed.

8. The construction apparatus of claim 7 wherein said screed comprises one of an asphalt screed and a concrete screed.

9. The construction apparatus of claim 1 including a laser source comprising a substantially non-rotating beam.

10. The construction apparatus of claim 9 wherein said control calculates an offset of a portion of said bucket from said body.

11. The construction apparatus of claim 10 including a geographic positioning system at said body, wherein said control calculates a geographic position of said portion of said bucket by combining said offset with an output of said geographic positioning system.

12. The construction apparatus of claim 9 wherein said control determines said physical relationship by capturing with said camera a portion of said bucket and said illuminated image.

13. The construction apparatus of claim 1 wherein said control determines said direction information and said separation information at least in part from said output of said camera.

14. The construction apparatus of claim 1 wherein said control comprises a microcomputer that is programmed with image discrimination software and wherein said control determines said relationship by recognizing with said software a portion of said construction tool that is captured by said camera.

15. The construction apparatus of claim 14 wherein said image discrimination software comprises shape recognition software.

16. A construction apparatus that is adapted to be guided from a laser source made up of a substantially non-rotating beam, said construction apparatus comprising:
   a body having an operators cab, said body adapted to be moveably supported by a surface, a construction tool adapted to move material, a support moveably supporting said construction tool from said body, and a control for guiding movement of said construction tool;
   said control comprising a camera that is adapted to capture an illuminated image that is derived from a laser source, said control adapted to determine direction and separation information of the illuminated image with respect to said apparatus, wherein said camera is gimbal mounted and wherein said control determines said direction information by substantially tracking with said camera the illuminated image and by monitoring with said control a position of said camera about said gimbal;
   said control further adapted to determine a physical relationship of said construction tool with respect to said illuminated image;
   whereby said construction tool can be guided with respect to the image derived from a laser source as a function of said direction and separation information and said relationship.

17. The construction apparatus of claim 16 including a laser source comprising a substantially non-rotating beam.

18. The construction apparatus of claim 17 wherein said laser source is positioned at one end of a pipe and said illuminated image comprises a spot produced by said laser source impinging a target at an opposite end of the pipe.

19. The construction apparatus of claim 18 including another camera that is gimbal mounted and wherein said control determines said separation information by monitoring positions of said cameras about their respective gimbals.

20. The construction apparatus of claim 17 wherein said laser source is positioned at said body and directed toward material being moved by said construction tool, thereby creating said illuminated image at said material.

21. The construction apparatus of claim 20 wherein said control determines said direction information and said separation information at least in part from said output of said camera.

22. The construction apparatus of claim 16 including a display at said cab for displaying information related to said direction and separation information and said relationship.

23. The construction apparatus of claim 16 wherein said control is adapted to automatically guide said construction tool with respect to said illuminated image by comparing said direction and separation information and said relationship.

24. The construction apparatus of claim 16 wherein said control comprises a microcomputer that is programmed with image discrimination software and wherein said control determines an offset of said construction tool from said body by recognizing with said software at least a portion of said construction tool or said support that is captured by said camera.

25. The construction apparatus of claim 24 wherein said image discrimination software comprises shape recognition software.

26. A construction apparatus that is adapted to be guided from a laser source made up of a substantially non-rotating beam, said construction apparatus comprising:
   a body having an operator's cab, said body adapted to be moveably supported by a surface, a construction tool adapted to move material, a support moveably supporting said construction tool from said body, and a control for guiding movement of said construction tool;
   said control comprising a camera that is adapted to capture an illuminated image that is derived from a laser source, said control adapted to determine direction and separation information of the illuminated image with respect to said apparatus, wherein said camera includes a sensing array and a focusing optic that focuses light onto a portion of said sensing array and wherein said control determines said direction information by determining which portion of said sensing array receives light from said illuminated image;
   said control further adapted to determine a physical relationship of said construction tool with respect to said illuminated image;
   whereby said construction tool can be guided with respect to the image derived from a laser source as a function of said direction and separation information and said physical relationship.

27. The construction apparatus of claim 26 including a laser source comprising a substantially non-rotating beam.

28. The construction apparatus of claim 27 wherein said laser source is positioned at one end of a pipe and said illuminated image comprises a spot produced by said laser source impinging a target at an opposite end of the pipe.

29. The construction apparatus of claim 28 including another camera including another sensing array and another focusing optic that focuses light onto a portion of said another sensing array and wherein said control determines said separation information by determining which portions of said sensing arrays receive light from their respective gimbals.

30. The construction apparatus of claim 27 wherein said laser source is positioned at said body and directed toward material being moved by said construction tool, thereby creating said illuminated image at said material.

31. The construction apparatus of claim 30 wherein said control determines said direction information and said separation information at least in part from said output of said camera.

32. The construction apparatus of claim 27 wherein said control comprises a microcomputer that is programmed with image discrimination software and wherein said control determines an offset of said construction tool from said body by recognizing with said software at least a portion of said construction tool or said support that is captured by said camera.

33. The construction apparatus of claim 32 including a geographic positioning system at said body, wherein said control calculates a geographic position of said construction tool by combining said offset with an output of said geographic positioning system.

34. The construction apparatus of claim 26 including a display at said cab for displaying information related to said direction and separation information and said relationship.

35. The construction apparatus of claim 26 wherein said control is adapted to automatically guide said construction tool with respect to said illuminated image by comparing said direction and separation information and said relationship.

36. A pipe-laying system, comprising:
   a laser source that is positionable at one end of a pipe and a target that is positionable at an opposite end of the pipe, said laser source generating a beam that produces a spot on said target;
   an excavator having a body, a bucket and a support moveably supporting said bucket from said body, and a control for guiding movement of said bucket, said body including propelling devices and an operator's cab;
   said control comprising a camera that is adapted to capture the spot on said target and to determine direction information of the spot on said target with respect to said excavator, wherein said control determines separation information of the spot with respect to the excavator, wherein said control determines said direction information at least in part from an output of said camera;
   said control further adapted to determine a physical relationship of a portion of said bucket with respect to said illuminated image;
   whereby said bucket can-be guided with respect to the spot on said target as a function of said direction and separation information and said relationships.

37. The pipe-laying system of claim 36 including a display at said cab for displaying information related to said direction and separation information and said relationship.

38. The pipe-laying system of claim 36 wherein said control is adapted to automatically guide said portion of said bucket with respect to the spot on said target by comparing said direction and separation information and said relationship.

39. The pipe-laying system of claim 36 wherein said camera is positioned below a portion of said body that is joined with said articulated support.

40. The pipe-laying system of claim 36 including another camera that is adapted to capture the spot on said target and to determine direction information of the spot on said target with respect to said excavator and wherein said control determines said separation information from said direction information of said cameras.

41. An excavator for excavating material, comprising:
   a body, a bucket and a support moveably supporting said bucket from said body, and a control for guiding movement of said bucket, said body including propelling devices and an operator's cab;
   a laser source positioned at said body, said laser source comprising a substantially non-rotating beam that is directable toward material being excavated by said bucket, thereby creating an illuminated image at the material;
   said control comprising a camera that is adapted to capture the illuminated image and to determine direction information of the illuminated image with respect to the excavator, wherein said control determines separation information of the illuminated image with respect to the excavator, wherein said control determines said direction information at least in part from an output of said camera;
   said control further adapted to determine a physical relationship of a portion of said bucket with respect to said illuminated image;
   whereby said portion of said bucket can be guided with respect to the illuminated image at the material as a function of said direction and separation information and said relationship.

42. The excavator of claim 41 wherein said laser source is adapted to create the illuminated image at the material having a pattern, wherein said pattern varies as a function of separation between said laser source and the illuminated image at the material.

43. The excavator of claim 42 wherein said control determines vertical depth of the material being moved as a function of said pattern.

44. The excavator of claim 43 wherein said laser source creates said pattern from at least two laser units generating beams that are distinguishable from each other and at an angle with respect to each other.

45. The excavator of claim 41 wherein said control comprises a microcomputer that is programmed with image discrimination software and wherein said control determines an offset of said portion of said bucket with said software, said portion of said bucket or said support that is captured by said camera.

46. The excavator of claim 45 including a geographic positioning system at said body, wherein said control calculates a geographic position of said portion of said bucket by combining said offset with an output of said geographic positioning system.

47. The excavator of claim 45 wherein said articulated support is made up of multiple members that are articulated with respect to each other and wherein said control determines said offset at least in part by recognizing with said software portions of at least some of said multiple members.

48. The excavator of claim 47 including a geographic positioning system at said body, wherein said control calculates a geographic position of said construction tool by combining said offset with an output of said geographic positioning system.

49. The excavator of claim 41 including a display at said cab for displaying information related to said direction and separation information and said relationship.

50. The excavator of claim 41 wherein said control is adapted to automatically guide said portion of said bucket with respect to the material being excavated by comparing said direction and separation information and said relationship.

51. The excavator of claim 41 wherein said camera is positioned below a portion of said body that is joined with said articulated support.

52. A method of controlling a construction apparatus having a body, a construction tool adapted to move material, a support moveably supporting said construction tool from said body, and a control for guiding movement of said construction tool including an operators cab, said body adapted to be moveably supported by a surface, said method comprising:

providing a laser source that generates a substantially non-rotating beam and directing said beam with respect to the material to be moved to create an illuminated image with said laser source;

providing a camera and capturing with said camera said illuminated image;

determining direction information of said illuminated image at least in part from an output of said camera;

determining separation information between said illuminated image and said body;

determining a physical relationship between said construction tool and said illuminated image; and guiding said construction tool with respect to said illuminated image as a function of said direction and separation information and said relationship.

53. The method of claim 52 including displaying to an operator information related to said direction and separation information and said relationship and manually guiding said construction tool with the operator.

54. The method of claim 52 including automatically guiding said construction tool with respect to said illuminated image by comparing said direction and separation information and said relationship.

55. The method of claim 52 including determining from an output of said camera an offset from the body of a portion of the construction tool.

56. The method of claim 55 including determining a geographic position of said body and calculating a geographic position of said construction tool by combining said offset with an output of said geographic positioning system.

57. The method of claim 52 including determining said separation information from an output of said camera.

* * * * *

UNITED STATES PATENT AND TRADEMARK OFFICE
CERTIFICATE OF CORRECTION

PATENT NO.    : 6,736,216 B2
DATED         : May 18, 2004
INVENTOR(S)   : Hassel J. Savard and Robert A. Hasara It is certified that error appears in the above-identified patent and that said Letters Patent is hereby corrected as shown below:

Column 4,
Line 24, "a" should be -- $\alpha$ --.

Column 10,
Line 22, "can-be" should be -- can be --.

Signed and Sealed this

Twenty-seventh Day of September, 2005

JON W. DUDAS
*Director of the United States Patent and Trademark Office*